Figure 1:
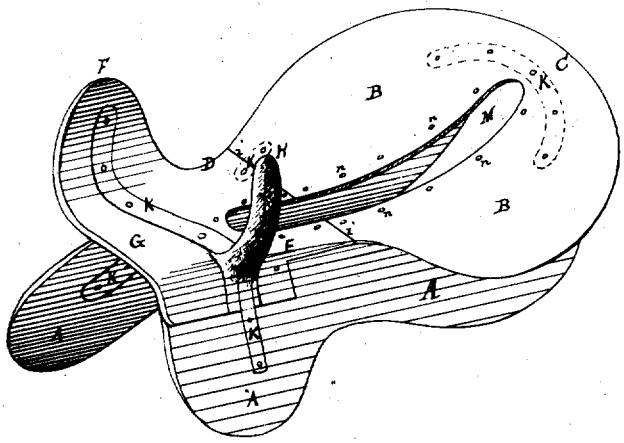

Gathright & Freeman.

Side Saddle.

No. 4,041. Reissued June 21. 1870.

Witnesses
A. T. Moore
J. F. Bonner

John T. Gathright
by
Ass Stout his atty

N. PETERS, PHOTO-LITHOGRAPHER, WASHINGTON, D. C.

United States Patent Office.

JOHN T. GATHRIGHT, OF LOUISVILLE, KENTUCKY, ASSIGNEE OF HIMSELF AND JOHN C. FREEMAN.

*Letters Patent No.* 94,737, *dated September* 14, 1869; *reissue No.* 4,041, *dated June* 21, 1870.

IMPROVEMENT IN SIDE-SADDLES.

The Schedule referred to in these Letters Patent and making part of the same.

JOHN T. GATHRIGHT and JOHN C. FREEMAN, of the city of Louisville, in the county of Jefferson and State of Kentucky, have invented certain new and useful Improvements in the Form and Construction of Side-saddle Trees, of which the following is a specification.

The first part of the invention relates to the construction of the whole of the seat proper, cantle, near spring and off spring, off horn, support for the near horn and front of side-saddles, of a tough wood, cut thin so as to be light and sufficiently flexible, and then steaming it or leaving it in the natural state, pressing all the parts into exactly the desired shapes by the use of heated formers.

The second part of the invention relates to any easy and convenient mode of securing the parts above-mentioned to such side-bars as are in common use.

The third part of the invention relates to the manner of fixing the near horn into the wooden shell before mentioned, and of bracing the horn, front, cantle, and bars with plates of metal to afford them strength, and to preserve them in proper shape.

The fourth part of the invention relates to the making of said wooden shell in two parts only, and the manner of jointing them together, and fastening them securely upon the parts aforesaid.

In the drawing—

Figure 1 represents a perspective view of a side-saddle tree constructed with the said improvements.

Figure 2:
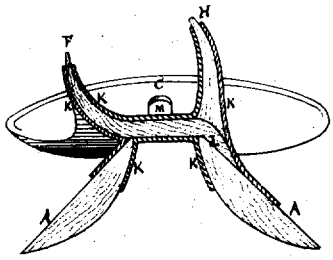

Figure 2, a vertical cross-sectional view, taken through both horns.

B B show the seat proper; C, the cantle; D, the off spring; E, near spring; F, off horn; G, the front and support for the near horn; all these parts being comprised in the wooden shell before mentioned, which is jointed at *i i*.

M is the longitudinal slot in the seat and between the side-bars. The edges of these bars next to the slot are trimmed down to the extent of the thickness of the shell, so as to afford a flat surface upon which the wooden shell is seated, and then fastened upon the bars, by the nails or screws *n n n n*, as shown in the drawing.

The letter K, wherever it occurs, indicates the metal-plate braces before mentioned.

A recess is cut into the wooden shell, into which is inserted the near horn H, as shown.

It will be obvious, upon a glance at the drawing, that, when this wooden shell has been pressed into proper form, as shown in the drawing, and fastened upon the bars, and the near horn inserted, and the several braces nailed or screwed upon it, the tree is finished, and that it is very simple, and, being exactly in the shape designed, no padding, filling, or bellying with leather or hair, or other like material, is necessary, and that the tree will be cheaper in construction, better in use, and will have fewer joints and parts to work loose, than any side-saddle tree heretofore known or used.

The wooden shell described, being sawed or cut with the grain of the wood, and not across it, is much more strong and elastic than it would be if cut across the grain, and, being pressed in the desired form while heated by steam or by the heated former, there need be no surplus material in the shell, while the utmost strength of the wood is preserved, and no padding at all is necessary, except such as may be desired to give softness to the seat.

Moreover, the wooden shell is made with the grain of the wood running crosswise or perpendicularly to the direction of the side-bars, and, by so doing, the springs and the off and near sides of the concave seat are rendered much stronger.

What is claimed as new, and desired to be secured by Letters Patent, is—

1. The seat B B C, pressed into the form shown, in one or more pieces of wood, and fastened upon the side-bars A A, in the manner described, substantially as and for the purpose set forth.

2. The off horn F, front G, off spring D, near spring E, made of one or more pieces of wood, cut and pressed, in the manner described, in the form shown, in combination with the seat proper, composed of B B and C, substantially as above set forth.

3. The entire wooden shell, composed of arms B B C, off horn F, off spring D, near spring E, front G, in two or more pieces of wood, cut and compressed into the form shown, substantially in the manner and for the purpose described.

4. The near horn H, inserted as described, in combination with the described wooden shell, in two or more pieces, substantially as described.

5. The described wooden shell, in two or more pieces, pressed into the form shown, and braced as described, in combination with the side-bars A A, substantially as described.

JNO. T. GATHRIGHT.

Witnesses:

A. M. STOUT, Jr.,

A. L. MELLEN.